Figure 1:
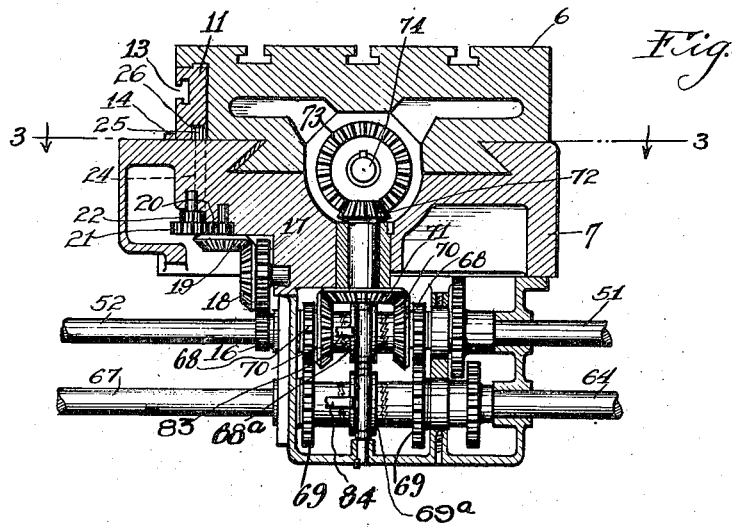

Oct. 7, 1924.

G. D. SUNDSTRAND

MILLING MACHINE

Filed Feb. 16, 1920

1,510,566

2 Sheets-Sheet 1

WITNESS:

INVENTOR.
GUSTAF D. SUNDSTRAND.

ATTORNEYS.

Oct. 7, 1924.
G. D. SUNDSTRAND
MILLING MACHINE
Filed Feb. 16, 1920
1,510,566
2 Sheets-Sheet 2
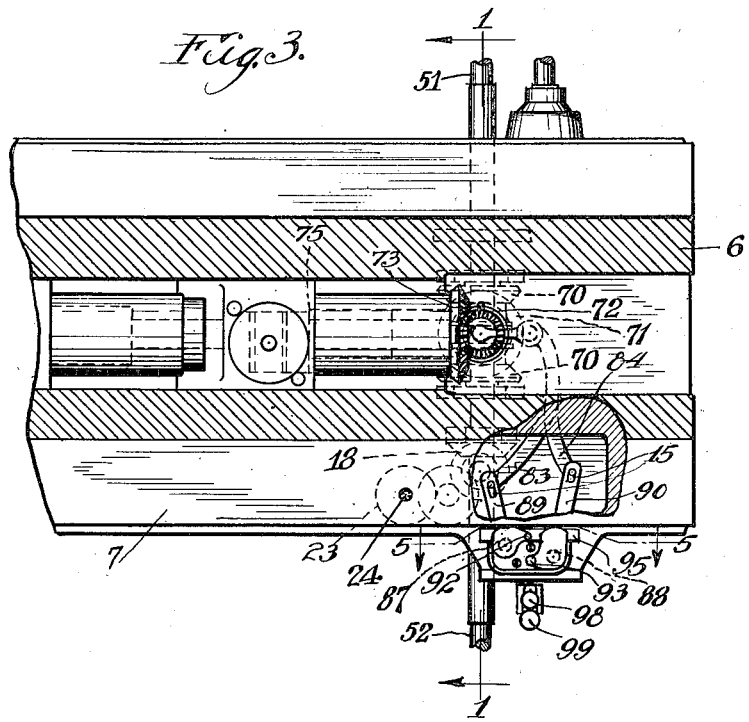
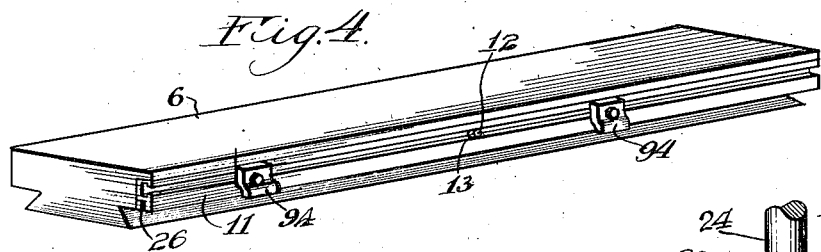
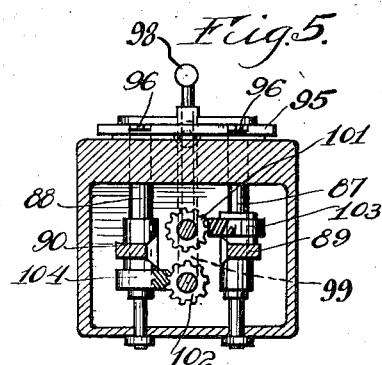
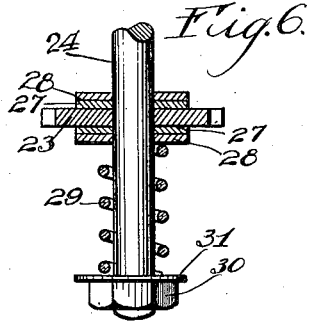
WITNESS:
Wm Casati
INVENTOR.
GUSTAF D. SUNDSTRAND.
By Miller Chindohl Parker
ATTORNEYS.

Patented Oct. 7, 1924.

1,510,566

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

MILLING MACHINE.

Application filed February 16, 1920. Serial No. 359,082.

*To all whom it may concern:*

Be it known that I, GUSTAF D. SUNDSTRAND, a citizen of the United States, residing at Rockford, in the county of Winnebago, and State of Illinois, have invented certain new and useful Improvements in Milling Machines, of which the following is a specification.

My invention relates to milling machines and more specifically to automatic mechanisms for controlling the table feed of such machines.

Devices for automatically moving a milling machine table at different speeds during different portions of its travel and automatically returning it to the initial position are old in the art. In all of these devices a series of dogs or elements movable with or in proportion to the motion of the table engage control levers or mechanisms of various sorts to actuate clutches and change the rate of feed of the table. It is, in general, necessary to throw out one clutch before another is thrown in, but the disengagement of the first clutch will stop the movement of the table and the dogs, and it has been necessary to provide special mechanism for throwing in another clutch without further movement of the table. This has heretofore been accomplished by means of a lost motion connection between the dog or controlling element and the clutch element; and the use of a spring tensioned by the initial movement before the table is stopped to continue the movement after the table stops. Devices of this sort are sudden and violent in their operation, imposing severe strains on the machines; and are frequently not positive in their operation, because after the clutch teeth have become slightly worn they may fail to engage properly. As a consequence of this the operation of the machine is momentarily interrupted, and chattering and further wearing away of the clutch teeth also results.

The object of my invention is to eliminate the defects above mentioned and others, by the provision of improved mechanism for the automatic control.

According to my invention friction means are provided for continuing the motion of the table or of some part of the transmission from the table to the clutches to move the next clutch slowly and with a relatively positive drive into engagement to start the table on its next movement. In case the friction drive is applied to some intermediate element of the transmission from the table to the clutch, a lost motion connection is provided between the table and the frictionally driven element to allow the table to remain at rest until the next clutch is thrown in. There is, however, no lost motion and no resilient connection between the friction drive and the clutch element.

Further objects and advantages of my invention will become apparent as the description proceeds.

In the accompanying drawings, I have illustrated the application of the principles of my invention to a well known device of the prior art. It will be obvious that this device is selected only for the purposes of illustration and that my invention may be applied to any other type of automatically-controlled milling machine.

Figure 2:
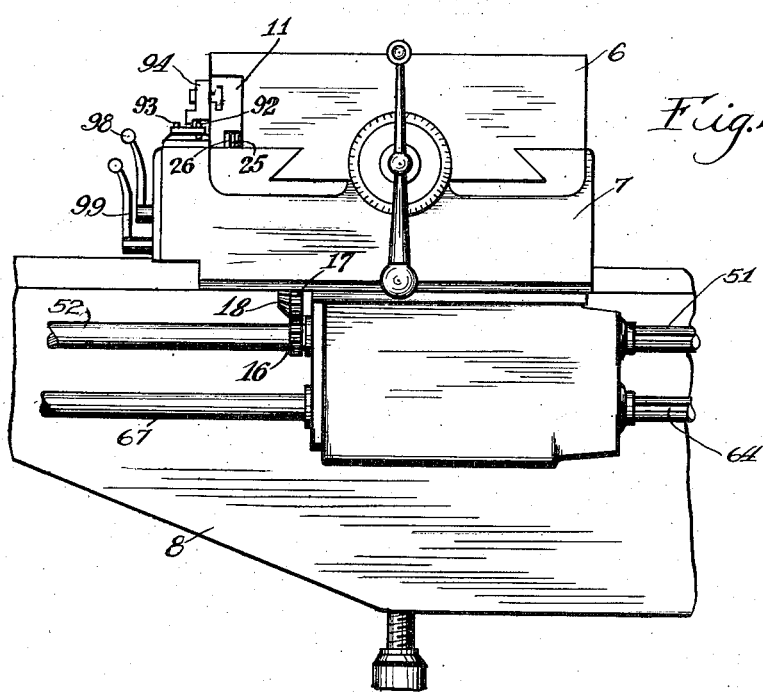

Referring to the drawings, Figure 1 is a section through the table and saddle of the machine illustrating the application of my invention thereto. Fig. 2 is a fragmentary side view of the knee and parts carried thereby. Fig. 3 is a horizontal section taken on line 3—3 of Fig. 1. Fig. 4 is a perspective view of the table. Fig. 5 is a section on line 5—5 of Fig. 3 and Fig. 6 is a detail view of a friction connection.

In the embodiment of my invention selected for illustration, the machine is provided with a reciprocatory table or work-supporting member 6 which is mounted below the arbor or spindle on a saddle or member 7 and movable horizontally in a course or path transverse to the arbor or spindle. The saddle or member 7 is mounted on a vertically movable knee 8 and movable parallel with the tool arbor or spindle, the knee being supported and guided by vertical ways on the usual frame or column, (not shown), all according to the well known practice in machines of this class.

Shaft 51 drives shaft 52 slowly in one direction and shaft 64 drives shaft 67 rapidly in the opposite direction. Any suitable driving transmission (not shown) may be employed for this purpose. The table 6, is driven by the nut 75 (Fig. 3) carrying the bevel gear 73 and engaging the stationary feed screw 74. Motion is transmitted to the gear 73 and the table 6 for feeding it slowly or rapidly in either direction through bevel gear 72 mounted on the same shaft with bevel gear 71. The gear 71 is arranged to be driven from the opposing bevel gears 70 which are integrally united to gears 68 turning freely on shaft 52. Either of the gears may be clutched to the shaft by the splined driven collars 68$^a$ to move the table slowly in either direction. For a traverse at a more rapid rate in either direction, gears 69 normally turning freely on shaft 67 are clutched selectively to shaft 67 by the splined driven collar 69$^a$ to drive either of the gears 68 and through them, the table 6.

The dogs 94, two of which appear in full lines in Fig. 4, instead of being mounted directly on the table 6, as heretofore, are carried by a separate panel 11 slidably mounted in the face of the table 6 and having a lost motion connection therewith. I have illustrated such a connection in the nature of a pin 12 entering an elongated slot 13 (Fig. 4). The panel 11 may be slidably mounted in any suitable manner as, for instance, by its engagement on the top and one side with the adjacent faces of the table 6 and by one or more retaining blocks 14 (Fig. 1) fastened on and carried by the saddle.

The usual spring means for operating the reversing change-speed clutches 68$^a$ and 69$^a$ is omitted. Instead, clutch shifting levers 83 and 84 (Fig. 3) carry simple pins entering slots 15 in arms 89 and 90 which are respectively rigidly secured to shafts 87 and 88 (Fig. 5). Rigid with the upper ends of said shafts I provide upstanding projections 92 and 93. The dogs 94 engage the projections 92 or 93 to rotate shafts 87 or 88 (Fig. 5), thereby actuating arms 89 or 90 and shifting levers 83 or 84 respectively. The latter, it will be seen, (Fig. 1) are respectively connected with the clutch sleeves 68$^a$ and 69$^a$. The projections 92 and 93 are mounted upon members rigid with the shafts 87 and 88, and on said numbers are downwardly projecting pins 96 which enter notches in the slide 95 to prevent simultaneous engagement of different clutches, the arrangement being such that when one of the dogs 94 operates to turn, for example, the shaft 87, the slide is moved with it and in such position operates to hold the other shaft 88 from turning. The hand controlling levers 98 and 99 are connected to the shafts 87 and 88 (Fig. 5) by the spiral gears 101 and 103 and 102 and 104 respectively for manual operation of the clutch elements. By virtue of this connection the arms 89 or 90 may be actuated to shift the levers 83 or 84 either by the dogs 94 engaging the projections 92 or 93 or by the operator shifting the hand levers 98 or 99.

I have provided a friction transmission from the shaft 52 to the panel 11 (Fig. 1). As illustrated this transmission comprises a pinion 16 carried by shaft 52 and engaging a gear 17 suitably mounted on a stub shaft in the saddle 7. A bevel gear 18 integrally united to the gear 17 drives a bevel gear 19 which carries a pinion 20 driving an intermediate gear 21 mounted on the same shaft with an intermediate pinion 22 which, through the final gear 23 (Fig. 3) drives a vertical shaft 24 carrying at its upper end a pinion 25 meshing with a suitable rack 26 on the panel 11.

Motion is transmitted from the gear 23 to the shaft 24 by a suitable friction connection which I have illustrated in Fig. 6 as comprising friction washers 27 confined by metal washers 28 splined to the shaft 24 to rotate with it. The gear 23 is rotatably mounted on the shaft and relative rotation between the gear and shaft is resisted by the frictional engagement of the washers 27 between the gear 23 and the retaining washers 28. A spring 29 held in place by a suitable nut 30 and washer 31 resiliently maintains the friction elements in contact with each other.

The speed ratio of the transmission from the shaft 52 to the panel 11 is such that when the table is being fed, the friction transmission tends to move the panel 11 a trifle slower than the feed of the table. The panel by lagging will therefore move to the left as indicated in Fig. 4, so that the pin 12 lies at the right hand end of the slot 13 after which the panel is constrained to move in unison with the table thereby forcing the friction discs 27 to slip with respect to the gear 23.

When a dog 94 engages one of the pins 92 or 93 as the case may be to disengage one of the clutches, the motion of the table will be arrested but the panel 11 will continue to move and carry the same dog or another dog far enough to complete the clutch shifting operation and start the table again. The table in its motion will soon overtake the slower moving panel and as before carry it along by engagement of the pin 12 with the end of the slot 13.

It will thus be apparent that the speed of the table can be changed any desired number of times while the table moves through its stroke simply by employing a correspondingly larger number of dogs and the table may be reversed at the end of its stroke to return to its initial position. Upon return to the initial position, however, the panel 11 which is continuously urged in the same direction by the friction transmission will not continue the reverse movement and the table will therefore remain stopped to allow the work on it to be replaced, after which it must be started by the operator.

It will be seen that I have provided improved means for completing the clutch shifting operation after the stoppage of the table. The operation of my device is positive, relatively quiet and the device is durable in service and does not reverse or change the speed of the table so abruptly as to impose severe strains on the transmission.

It may be readily applied by any competent mechanic or machine designer to any of the various common types of milling machines, such, for instance, as the knee type with independent transmissions for the knee and traverse on opposite sides of the column and with reversing boxes at opposite ends of the saddle; the differential type in which the feed is produced by driving the feed screw and its nut at slightly different speeds and the traverse is produced by stopping one or the other; or the planer type in which the table merely reciprocates and the tools are adjustable vertically and in one horizontal direction.

While I have described and illustrated in detail a specific embodiment of my invention, it should be clearly understood that the description is only for purposes of illustration and that many modifications and variations will naturally occur to those skilled in the art. I aim in the subjoined claims to cover all such legitimate variations and modifications.

I claim as my invention:

1. In a device of the class described, a reciprocating table, a dog mounted adjacent the front edge of said table, automatically operable means for changing the speed of said table, said dog being adapted upon longitudinal motion with said table to actuate said automatic means for changing the speed of said table at a predetermined position thereof, and a lost motion connection between said table and said dog.

2. In a device of the class described, a reciprocating table, a dog mounted adjacent the front edge of said table, automatically operable means for changing the speed of said table, said dog being adapted upon longitudinal motion with said table to actuate said automatic means for changing the speed of said table at a predetermined position thereof, a lost motion connection between said table and said dog, and an impositive transmission normally operating to move said dog at a slightly slower rate than the slowest rate of motion of said table.

3. In a device of the class described, a table, a slidable panel carried by said table, means for limiting the relative sliding movement of said table and said panel, a dog carried by said panel, automatic control means for controlling the motion of said table, said dog being adapted in the motion of said table to actuate said means, and impositive transmission means normally tending to move said panel at a slightly slower rate than the slowest rate of motion of said table.

4. In a device of the class described, power operated means, a table driven thereby, a power transmission from said means to said table, a control transmission for controlling said power transmission, elements carried by said table adapted to actuate said control transmission, and a lost motion connection between said table and said elements.

5. In a device of the class described, power operated means, a table driven thereby, a power transmission from said means to said table, a control transmission for controlling said power transmission, elements carried by said table to actuate said control transmission, a lost motion connection between said table and said elements, and friction drive means continuously operated and tending to actuate said control transmission independent of the motion of said table.

6. In a device of the class described, power operated means, a table driven thereby, a power transmission from said means to said table, a transmission for controlling said power transmission, elements carried by said table for actuating said control transmission, a lost motion connection interpolated in said control transmission, and friction drive means tending to actuate the portion of said control transmission between said lost motion connection and said power transmission in one direction only.

7. In a device of the class described, a table, power operated means for moving said table at various rates, a control transmission, a dog carried by said table adapted in the movements thereof to automatically actuate said transmission to control the action of said power operated means on said table, and additional continuously actuated friction means for continuing the motion of said control transmission when said power operated means is disconnected from said table.

8. In a device of the class described, a table, power operated means for moving said table at different rates, selectively operable clutches for controlling the action of said power operated means on said table, control means operable by said table in its movements for automatically operating said clutches, an intermediate element of said control means having a frictional driving connection with said power operated means whereby it is adapted to continue its movement when said table is stationary, and a lost motion connection between said intermediate element thus driven and said table.

9. In a device of the class described, power operated means, a table driven thereby, a power transmission between said means and said table, devices for controlling said power transmission, a control transmission, an element carried by said table and extending from said table to said control transmission adapted to actuate the same, a lost motion connection interpolated in said control transmission, and means for continuing the motion of the portion of said control transmission between said lost motion connection and said power transmission, when said table is stationary.

10. In a device of the class described, power operated means, a table driven thereby, a power transmission from said means to said table, a transmission for controlling said power transmission, an element carried by said table adapted to actuate said control transmission, and means for continuing the motion of said transmission after said source of power has been disconnected from said table.

11. In a device of the class described, power operated means, a table driven thereby, a power transmission between said table and said means, said transmission comprising clutches, control means operable by said table in its movement to disconnect clutches, said means including a member having lost motion connection with said table and continuously and impositively operated from the live side of said power transmission, said member being adapted when said table stops at a feed position to move to an advanced position relative to said table to engage another clutch whereby to continue the movement of said table.

12. In a machine of the class described, the combination of a table adapted to reciprocate, a power transmission for said table comprising clutches, control means operable in the movement of said table for disengaging clutches, said means comprising a member capable of movement relative to said table and adapted to be operated from said power transmission to continue to move when said table stops due to the disengagement of a clutch, said member in its continued movement when said table has stopped being adapted to engage another clutch to continue the movement of said table.

13. In a machine of the class described, the combination of a table adapted to reciprocate and to move at variable rates on the feed stroke and at a uniform rate on the traverse stroke, a power transmission for said table comprising clutches, control means operable in the movement of said table for disengaging clutches, said means comprising a member capable of movement relative to said table and adapted to continue to move when said table stops due to the disengagement of a clutch, said member in its continued movement being adapted to engage another clutch to continue the movement of said table, said member being adapted to move to an advanced position with respect to said table only when the latter moves on its forward stroke and stops, whereby when said control means causes the disengagement of the traverse clutch at the end of the traverse stroke, said member does not engage a feed clutch so that said table stops at the end of each cycle of movements.

14. In a machine of the character described, a table adapted for reciprocatory movement, power operated means for driving the same, a power transmission from said means to said table, said table being adapted to support work and to move the same with respect to a cutting tool, clutches in said transmission, control means for operating said clutches, means carried by said table adapted at certain positions of said table in its movements to actuate said control means to disengage a clutch, said control means comprising a member movable relative to said table in advance thereof when said table stops on the feed stroke, to engage another clutch to continue the movement of said table, said member being movable only in an outward direction whereby when said table returns on the traverse stroke and disengages the clutch to stop said table said member does not engage another clutch so that said table remains stationary to permit resetting of the work or cutting tool before the same is again started by manual operation of a clutch.

15. In a machine of the class described, a table, power operated means for driving the same, a power transmission between said table and said means, said transmission comprising clutches, control means for operating said clutches, and actuating means independent of said control means carried by said table adapted at predetermined positions thereof in its movements to actuate said control means, said actuating means being adapted to actuate said control means whereby to move said table through a cycle comprising a feed stroke and a traverse stroke whereupon said table is stopped to permit resetting of the work on said table before said table is moved again on the feed stroke.

In testimony whereof, I have hereunto set my hand.

GUSTAF DAVID SUNDSTRAND.